3,829,410
5-(CYANOVINYLENE)-2-THIAZOLYLAZO-ANILINE COMPOUNDS

John G. Fisher, Max A. Weaver, and Clarence A. Coates, Kingsport, Tenn., assignors to Eastman Kodak Company, Rochester, N.Y.
No Drawing. Continuation-in-part of abandoned application Ser. No. 21,179, Mar. 19, 1970. This application Sept. 11, 1970, Ser. No. 71,365
Int. Cl. C09b 29/08; D06p 3/26, 3/54
U.S. Cl. 260—158                 10 Claims

ABSTRACT OF THE DISCLOSURE

Azo compounds useful as dyes for polyester textile materials have an aniline or a 1,2,3,4-tetrahydroquinoline coupling component and a 2-thiazolyl diazo component which, at the 5-position is substituted with a group having the formula

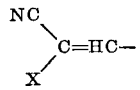

in which X is a substituent such as cyano, alkoxycarbonyl, alkylsulfonyl, or carbamoyl. The azo compounds produce blue shades on polyester fibers and exhibit improved fastness to light and sublimation.

---

This application is a continuation-in-part of our co-pending United States Patent Application Ser. No. 21,179, filed Mar. 19, 1970, now abandoned.

This invention relates to certain novel azo compounds and, more particularly, to certain water-insoluble, monoazo compounds and textile materials dyed therewith.

The novel compounds of the invention have the general formula (I)

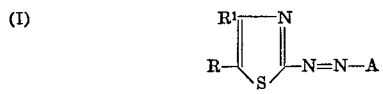

wherein

R is formyl or the group NC(X)C=CH— wherein X is cyano, a lower alkoxycarbonyl radical, a cycloalkoxycarbonyl radical, a lower alkylsulfonyl radical, an arylsulfonyl radical, cycloalkylsulfonyl radical, a carbamoyl radical, or a 2-benzimidazolyl radical;

$R^1$ is hydrogen, lower alkyl, benzyl, cycloalkyl, or aryl; and

A is the residue of an aniline or a 1,2,3,4-tetrahydroquinoline coupling component.

Azo dyes having a 2-thiazolyl diazo component are known to be suitable as disperse dyes for cellulose acetate and, to some extent, polyester fibers. Most common of such dyes are the 5-nitro-2-thiazolylazo dyes which produce blue shades on polyester fibers. However, those dyes are not completely suitable for polyester fibers because they are deficient in both fastness to light and resistance to sublimation. Also, on polyester fibers, most of the more lightfast blue thiazolylazo dyes flare red in artificial light which is another disadvantage.

When applied to polyester fibers according to conventional dyeing procedures, the novel azo compounds in which R is NC(X)C=CH— exhibit improved fastness to light and sublimation and, advantageously, produce blue shades, which do not flare red under artificial light.

The azo compounds in which R is formyl produce deep red to violet shades on cellulose acetate, polyamide and polyester textile materials. On cellulose acetate and polyamide fibers, this group of our novel azo compounds exhibits excellent fastness to gas and light. Certain members also possess improved wash-fastness and build-up.

In describing our novel compounds as water-insoluble, it is meant that the compounds are substantially insoluble in water because of the absence, from the structure thereof, of water-solubilizing groups such as sulfo, carboxyl and salts thereof. As used herein to describe a substituent containing an alkyl moiety, "lower" designates a carbon content of from 1 to about 4 carbon atoms.

The alkoxycarbonyl and alkylsulfonyl radicals represented by X can be substituted with groups such as hydroxy, lower alkoxy, cyclohexyl, lower alkanoyloxy, aryl, lower dialkylamino, lower alkylsulfonyl, cyano, etc. As used herein, "aryl" means phenyl or phenyl substituted with lower alkyl, lower alkoxy, nitro or halogen. Examples of the alkoxycarbonyl radicals represented by X include methoxycarbonyl, ethoxycarbonyl, butoxycarbonyl, isobutoxycarbonyl, 2 - cyanoethoxycarbonyl, 2,3 - dihydroxypropoxycarbonyl, benzyloxycarbonyl, 2-ethoxyethoxycarbonyl, etc. Cyclohexoxycarbonyl and lower alkylcyclohexoxycarbonyl are tpical cycloalkoxycarbonyl groups which X represents. Methylsulfonyl, ethylsulfonyl, propylsulfonyl, butylsulfonyl, phenylsulfonyl, cyclohexylsulfonyl, lower alkylcyclohexylsulfonyl such as 4-ethylcyclohexoxycarbonyl are typical cycloalkoxycarbonyl and p-ethoxyphenylsulfonyl are representative of the alkyl-, cycloalkyl-, and aryl-sulfonyl groups which X can represent. The carbamoyl radicals represented by X can be unsubstituted carbamoyl, lower alkylcarbamoyl, such as butylcarbamoyl, dimethylcarbamoyl, dipropylcarbamoyl and ethylcarbamoyl, arylcarbamoyl such as phenylcarbamoyl, p-tolylcarbamoyl, and p-anisylcarbamoyl, or cyclohexylcarbamoyl such as 3-methylcyclohexylcarbamoyl. Methyl, ethyl, propyl, butyl, phenyl, o,p-dimethylphenyl, p-bromophenyl, p-anisyl, o-tolyl, m-chlorophenyl and p-formylphenyl, benzyl, cyclohexyl, and 3-ethylcyclohexyl are typical of the substituents represented by $R^1$.

The coupling components from which radical A is derived are well known compounds. The aniline and tetrahydroquinoline coupling components are described in the following patents:

| U.S. 2,249,749 | U.S. 3,161,632 | U.S. 3,359,256 |
|---|---|---|
| U.S. 2,249,774 | U.S. 3,206,452 | U.S. 2,891,942 |
| U.S. 2,251,947 | U.S. 3,336,285 | U.S. 3,268,507 |
| U.S. 2,286,795 | U.S. 3,349,075 | U.S. 2,967,858 |
| U.S. 2,309,129 | U.S. 3,370,055 | U.S. 2,971,953 |
| U.S. 2,436,100 | U.S. 3,379,711 | U.S. 3,117,956 |

| U.S. 2,683,708 | U.S. 3,380,990 | U.S. 3,122,410 |
| U.S. 2,683,709 | U.S. 3,386,988 | U.S. 3,178,405 |
| U.S. 2,726,237 | U.S. 3,423,394 | U.S. 3,206,454 |
| U.S. 2,773,054 | U.S. 3,424,741 | U.S. 3,329,669 |
| U.S. 2,785,157 | U.S. 3,429,871 | U.S. 3,342,800 |
| U.S. 2,805,218 | U.S. 3,442,886 | U.S. 3,398,135 |
| U.S. 3,148,180 | U.S. 2,092,398 | U.S. 3,406,165 |
| | | U.S. 3,407,189 |

A preferred group of the coupling components A have the formula

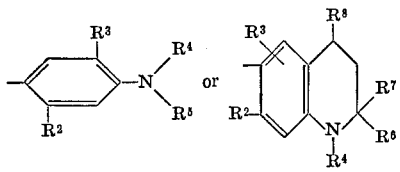

wherein $R^2$ is hydrogen, lower alkyl, lower alkoxy, halogen or an acylamino group having the formula —NH—X—$R^9$ or —NHCOO—$R^{10}$ in which Y is —CO— or —$SO_2$—; $R^9$ is lower alkyl, cycloalkyl, aryl, lower alkylamino, di-lower alkylamino or arylamino; and $R^{10}$ is lower alkyl, cycloalkyl or aryl; $R^3$ is hydrogen, lower alkyl, lower alkoxy, aryloxy, lower alkylthio, arylthio, or halogen; $R^4$ individually is an alkyl radical having from 1 to about 8 carbon atoms or cycloalkyl; $R^5$ individually is hydrogen or an alkyl radical (not necessarily the same) which $R^4$ can represent;

collectively is a group having the formula

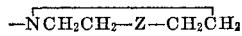

in which Z is —$CH_2$—, —O—, —S—, —SO—, —$SO_2$— or >N—$R^{11}$ in which $R^{11}$ is lower alkyl, lower alkanoyl, aroyl, lower alkylsulfonyl, arylsulfonyl or lower alkoxycarbonyl; and $R^6$, $R^7$ and $R^8$ are the same or different and each is hydrogen or lower alkyl. Preferably, $R^6$ and $R^8$ each is hydrogen or methyl and both are hydrogen when $R^7$ is alkyl of 2 to 4 atoms.

Methyl, ethyl, propyl, isopropyl, butyl, isobutyl, methoxy, ethoxy, propoxy, butoxy, phenoxy, p-ethylphenoxy, m-bromophenoxy, p-tolyloxy, methylthio, ethylthio, butylthio, phenylthio, p-ethoxyphenylthio, p-chlorophenylthio, chlorine, and bromine are examples of the substituents generically described in the above definitions of $R^2$, $R^3$, $R^6$, $R^7$ and $R^8$.

The lower alkyl groups represented by $R^9$ and $R^{10}$ can be unsubstituted or substituted, for example, with halogen, phenyl, cyano, lower alkoxy, lower alkylsulfonyl, hydroxy, lower alkylthio, lower alkanoyloxy, etc. Cyclohexyl and lower alkylcyclohexyl are representative cycloalkyl groups represented by $R^9$ and $R^{10}$. Methylamino, ethylamino, and butylamino are typical alkylamino groups which $R^9$ can represent. Examples of groups represented by $R^9$ and $R^{10}$ and the aryl component of the arylamino groups represented by $R^9$ are set forth hereinabove. Acetyl, propionyl, butyryl, cyanoacetyl, chloroacetyl, bromoacetyl, trifluoroacetyl, phenylacetyl, methoxyacetyl, ethylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-methoxyethylsulfonyl, 2-chloroethylsulfonyl, cyclohexoyl, 4-ethylcyclohexoyl, benzoyl, 4-ethylbenzoyl, 3-nitrobenzoyl, 4-cyanobenzoyl, 4-ethoxycarbonylbenzoyl, phenoxycarbonyl, 2,4-dichlorophenoxycarbonyl, 4-bromophenoxycarbonyl, 4-acetamidophenoxycarbonyl, benzenesulfonyl, p-toluenesulfonyl, 4-propionamidophenylsulfonyl, 4-chlorophenylsulfonyl, cyclohexoxycarbonyl, 4-butylcyclohexylsulfonyl, ethylcarbamoyl, butylsulfamoyl, phenylcarbamoyl, p-tolylcarbamoyl, p-anisylcarbamoyl, and phenylsulfamoyl are typical groups represented by —Y—$R^9$ and —COO—$R^{10}$.

The alkyl radicals represented by $R^4$ and/or $R^5$ can be unsubstituted or substituted, straight- or branch-chain alkyl. Methyl, ethyl, propyl, isopropyl, butyl, isobutyl, hexyl, 2-ethylhexyl and 1,3-dimethylbutyl are typical unsubstituted alkyl groups. Examples of the substituents which can be present on those alkyl groups are hydroxy, cyano, lower alkoxy, lower cyanoalkoxy, dicarboximido, such as succinimido, glutarimido and phthalimido, aryl, aryloxy, alkylcarbamoyloxy, and arylcarbamoyloxy in which the aryl groups are any of those described hereinabove; piperidono, pyrrolidinono, phthalimidino, cyclohexyl, lower alkylcyclohexyl, carbamoyl, furyl, etc. The groups represented by $R^9$—Y—, $R^{10}$OOC—,

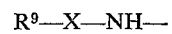

$R^{10}$—OOC—NH, $R^{10}$—OOCO— and $R^9$—COO— also can be present on the alkyl groups represented by $R^4$ and $R^5$. The substituted alkyl groups preferably are substituted lower alkyl. Specific examples of the substituted alkyl groups which $R^4$ and/or $R^5$ can represent include 2-hydroxyethyl, 2,3-dihydroxypropyl, 3-chloro-2-hydroxypropyl, 2-bromoethyl, 3-chloropropyl, 2-cyanoethyl, 2-ethoxyethyl, 4-methoxybutyl, 2-(2-cyanoethoxy)ethoxy, 2-acetoxyethyl, 2,3-dipropionoxypropyl, 2-succinimidoethyl, 3-phthalimidopropyl, benzyl, 4 - methoxycarbonylbenzyl, 2-(4-ethoxyphenyl)ethyl, 4-chlorobenzyl, 2-phenoxyethyl, 3 - (4 - acetamidophenoxy)propyl, 2 - phenylcarbamoyloxyethyl, 2 - (2-pyrrolidinono)ethyl, 3 - (2-piperidono)-propyl, 2-phthalimidinoethyl, 2-acetylethyl, 4-propionylbutyl, 2-ethoxycarbonylethyl, 2-carbamoylethyl, 3-isopropylcarbamoylpropyl, cyclohexylmethyl, 3 - (3 - ethylcyclohexyl)propyl, furfuryl, 2-methylsulfonylethyl, 2-sulfamoylethyl, 3 - butylsulfamoylpropyl, 2 - phenylsulfonylethyl, 2-(4-ethylbenzoyl)ethyl, 2-p-toloyloxyethyl, 2-acetamidoethyl, 2-methylsulfonamidoethyl, 3-benzamidopropyl, 2-ethoxycarbonyloxyethyl, 3-benzoyloxypropyl, etc. Cyclohexyl and lower alkylcyclohexyl are typical cycloalkyl groups which $R^4$ can represent.

Blue dyeings of excellent depth and exceptional fastness properties on polyester fibers are produced by the novel azo compounds having the general formula

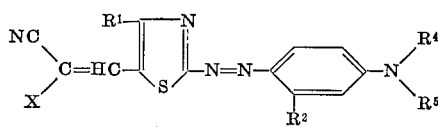

wherein

X is cyano or lower alkoxycarbonyl;

$R^1$ is aryl;

$R^2$ is hydrogen, methyl, lower alkanoylamino, lower alkoxycarbonylamino, benzamido, lower alkylsulfonamido, or lower alkylcarbamoyl;

$R^4$ is alkyl of 1 to about 8 carbon atoms; lower alkyl substituted with cyano, halogen, hydroxy, lower alkoxy, lower alkanoyloxy, lower alkoxycarbonyl, lower alkoxycarbonyloxy, lower alkanoylamido, carbamoyl, lower alkylcarbamoyl, di-lower alkylcarbamoyl, N-lower alkanoyl-lower alkanoylamino, N-lower alkylsulfonyl-lower alkanoylamino, benzamido, lower alkylsulfonamido, N-lower alkylsulfonyl-lower alkylsulfonamido, succinimido, glutarimido, phthalimido, or aryl; or cyclohexyl; and $R^5$ is an unsubstituted or substituted alkyl group which $R^4$ can represent, i.e., $R^4$ and $R^5$ can be the same or different.

The novel azo compounds which particularly are suited for and exhibit improved properties on cellulose acetate fibers have the general formula

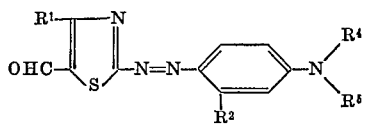

wherein $R^1$ is aryl;

$R^2$ is hydrogen, methyl, lower alkanoylamino, lower alkoxycarbonylamino, benzamido, lower alkylsulfonamido, or lower alkylcarbamoyl;

$R^4$ is alkyl of 1 to about 8 carbon atoms; lower alkyl substituted with cyano, halogen, hydroxy, lower alkoxy, lower alkanoyloxy, lower alkanoylamino, benzamido, or lower alkylsulfonamido; or cyclohexyl; and $R^5$ is an unsubstituted or substituted alkyl group which $R^4$ can represent.

The novel azo compounds having a 5-formylthiazolyl diazo component are prepared according to conventional procedures by diazotizing a 5-formyl-2-aminothiazole and coupling the resulting diazonium salt with the coupler having the formula H–A. The 5-(NC(X)C=HC)-thiazolylazo compounds of the invention can be prepared by either of the following procedures:

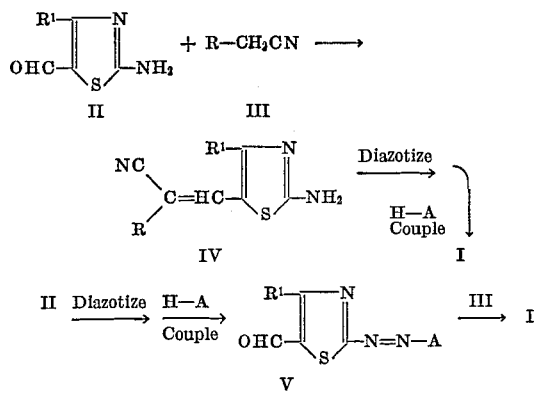

The formylthiazoles II, active methylene compounds III and couplers H—A are known compounds and/or can be prepared by published procedures or analogous techniques. For example, the formylthiazoles can be obtained by treating a thiazole with phosphorous oxychloride and dimethylformamide. Examples of 2-amino-5-formylthiazoles II include 2-amino-5-formyl-4-phenylthiazole, 2-amino-5-formyl-4-(p-anisyl)thiazole, 2-amino-5-formyl-4-(p - ethoxyphenyl)thiazole, 2-amino-5-formyl-4-(p-nitrophenyl)thiazole, 2 - amino-5-formyl-4-(p-bromophenyl)thiazole, 2 - amino-5-formyl-4-(o,p-dimethylphenyl)thiazole, 2-amino-4-butyl-5-formylthiazole, 2-amino-4-benzyl-5-formylthiazole, 2-amino-4-cyclohexyl-5-formylthiazole, etc. Malononitrile, methylcyanoacetate, ethylcyanoacetate, sec-butyl cyanoacettae, 2-hydroxyethyl cyanoacetate, 2-cyanoethyl cyanoacetate, 2-methoxyethyl cyanoacetate, 2-benzyl cyanoacetate, methylsulfonylacetonitrile, phenylsulfonylacetonitrile and 2-cyanoacetamide are typical active methylene compounds.

Compounds II and III can be reacted to produce IV by known procedures for the reaction of aldehydes with active methylene compounds. For example, good yields of IV are obtained by refluxing equimolar quantities of II and III in lower molecular weight alcohols in the presence of a basic catalyst such as piperidine. Compounds IV are diazotized using nitrosyl sulfuric acid and coupled to Compounds HA in the usual manner. In preparing the azo compounds by the second procedure, Compounds II are diazotized and coupled with the desired couplers in the usual manner to produce V. Compounds IV are reacted with active methylenes III under a variety of conditions. The condensation may be carried out under acid conditions using, for example, acetic anhydride plus sodium acetate. The condensation also may be carried out in the presence of a basic catalyst in a variety of solvents.

The preparation of the novel azo compounds and the above-described intermediates is further illustrated by the following examples.

EXAMPLE 1

2-Amino-5-formyl-4-phenylthiazole (6.12 g.), methyl cyanoacetate (3.0 g.), 100 ml. of alcohol, and 10 drops of piperidine are refluxed for one hour. The reaction mixture is cooled. The yellow product is filtered, washed with a little methanol, and air dried. The product has the structure:

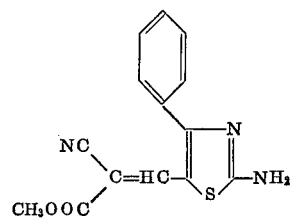

EXAMPLES 2-9

Diazotization and Coupling. To 10 ml. of conc. $H_2SO_4$ is added 1.4 g. of $NaNO_2$ with stirring. The nitrosyl sulfuric acid is cooled and 20 ml. of 1:5 acid (1 part propionic:5 parts acetic acid) is added below 15° C. The mixture is cooled and 5.70 g. of the amine from Example 1 is added, followed by an additional 20 ml. of 1:5 acid. Both additions are made at below 5° C. After stirring for one hour at 0–5° C., 70% $H_2SO_4$ (60 ml.) is added to bring about solution of the amine. The reaction mixture is stirred two hours longer at 0–5° C. The following couplers (.0025 mole) are dissolved in 15 ml. of 15% $H_2SO_4$: N,N-diethyl-m-acetamidoaniline (Example 2), N-cyclohexyl-N-ethyl-m-acetamidoaniline (Example 3), N-benzyl-N-ethyl-m-acetamidoaniline (Example 4), N-sec-butyl-2-methyl-5-acetamidoaniline (Example 5), N-sec-butyl-2-methoxy-5-acetamidoaniline (Example 6), N-(2-acetoxyethyl)-N-ethyl-m-toluidine (Example 7), N-(2-acetamidoethyl) - 2,7 - dimethyl-1,2,3,4-tetrahydroquinoline (Example 8), and 7-acetamido-N-ethyl-1,2,3,4-tetrahydroquinoline (Example 9). The diazonium solution (.0025 mole) is added to each of the couplers which has been previously chilled in an ice bath. After allowing the couplings to stand 15 minutes, the dyes are precipitated by adding water. The acid is neutralized by adding ammonium acetate. The azo compounds are collected by filtration, washed with hot water, air dried, and purified by recrystallizing from methanol or ethanol. These azo compounds produce bright, light-fast, blue dyeings on polyester fibers.

EXAMPLES 10-19

To a solution of 240 ml. water and 140 ml. conc. $H_2SO_4$ is added 2-amino-5-formyl-4-phenylthiazole (0.10 mole) at approximately 50° C. The mixture is cooled to 0° C. and a solution of sodium nitrite (7.2 g.) in 50 ml. of conc. $H_2SO_4$ is added below 5° C. The diazotization reaction is stirred at 0–5° C. for 1.5 hours. The following couplers (.005 mole) are dissolved in 20 ml. of 15% $H_2SO_4$ and the solutions chilled in ice bath:

N,N-Diethyl-m-acetamidoaniline (Example 10)
N-Benzyl-N-ethyl-m-acetamidoaniline (Example 11)
N-Cyclohexyl-N-ethyl-m-acetamidoaniline (Example 12)
N-(2-Chloroethyl)-N-ethyl-m-toluidine (Example 13)
N-(2-Cyanoethyl)-N-ethyl-m-toluidine (Example 14)
N-(2-Acetoxyethyl)-N-ethyl-m-toluidine (Example 15)
N-Ethyl-N-(2-succinimidoethyl)-m-acetamidoaniline (Example 16)
N-sec-Butyl-2-methyl-5-acetamidoaniline (Example 17)
N,N-di-β-Acetoxyethyl-m-acetamidoaniline (Example 18)
N-(2-Acetoxyethyl)-N-ethyl-m-acetamidoaniline (Example 19)

To each chilled coupler solution is added .005 mole aliquot of the diazotized amine. After allowing to stand for about one hour, the couplings are drowned with water and the azo compounds are collected by filtration, washed with water, and dried in air. The azo compounds of Examples 13 through 15 produce deep red shades and those of Examples 10 through 12 and 16 through 19 produce violet shades on cellulose acetate and polyester fibers. The dyed fibers exhibit excellent gasfastness and lightfastness.

EXAMPLE 20

The azo compound of Example 10 (.0025 mole), malononitrile (.003 mole), 15 ml. pyridine are heated on a steam bath until thin-layer chromatography shows the reaction to be complete (about 10 to 15 minutes). The azo compound is precipitated by drowning in water, collected by filtration, washed with water, and air dried.

EXAMPLE 21

The azo intermediate of Example 10 (.002 mole), methyl cyanoacetate (.0025 mole), 20 ml. of ethanol, and 3 drops of piperidine are heated on a steam bath for about 10 minutes, or until reaction is complete. The azo product crystallizes on cooling and is collected by filtration, washed with a little methanol, and dried. The product, which is the same as the azo compound of Example 2 has excellent lightfastness and resistance to sublimation on polyester fibers.

EXAMPLE 22

The intermediate of Example 13 (.0025 mole), malononitrile (.003 mole) and 15 ml. pyridine are reacted and the product is isolated as described in Example 20. The azo compound obtained produces a blue shade of excellent fastness properties on polyester fibers.

EXAMPLE 23

The azo intermediate of Example 12 (.0025 mole) and malononitrile (.003 mole) are reacted in pyridine and the dye isolated as described in Example 20. The dye obtained produces greenish-blue shades on polyester fibers.

EXAMPLE 24

The azo intermediate of Example 14 (.00125 mole), 3 ml. acetic anhydride, 5 ml. acetic acid, malononitrile (.003 mole) are heated at 90–95° C. for 2 hours. Thin-layer chromatography shows that the reaction is about one-half complete. The reaction is heated about 2 days at 40–45° C. and then drowned in water. The product is collected by filtration, washed with water, dried in air, and recrystallized from acetone.

EXAMPLE 25

The azo compound of Example 19 (.0025 mole), ethyl cyanoacetate (.003 mole), 20 ml. of ethanol, and 3 drops of piperidine are reacted as in Example 21 to yield an azo compound which produces bright blue shades on polyester fibers.

EXAMPLE 26

The intermediate of Example 10 (.0025 mole), phenyl-sulfonylacetonitrile (.0025 mole), 15 ml. pyridine are reacted until all of the aldehyde is used up (3–4 hours). The reaction rate is increased by the addition of a drop of piperidine. The product is isolated by drowning the reaction in water and filtering.

EXAMPLE 27

The azo intermediate of Example 10 (.0025 mole), 2-cyanoacetamide (.0025 mole), 15 ml. pyridine, 1 drop of piperidine are heated on a steam bath until reaction is complete. The product is isolated by drowning in water and collecting by filtration.

The novel azo compounds set forth in Tables I through V conform, respectively, to the formulas

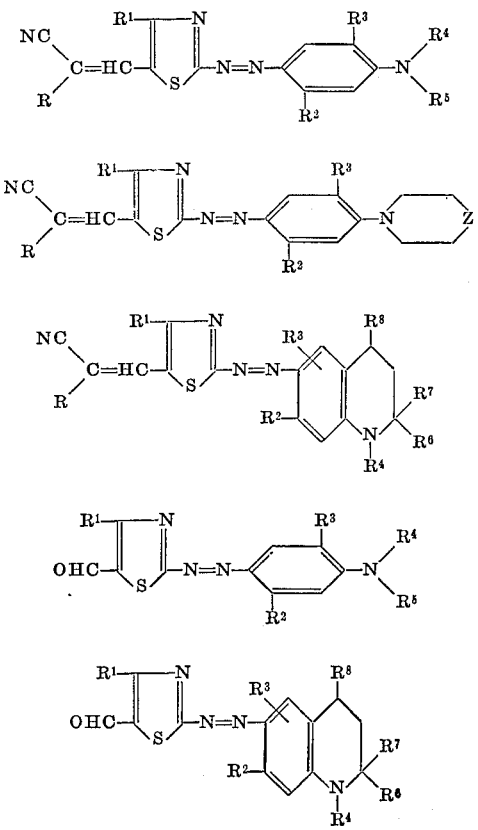

The structures of the novel compounds prepared in each of Examples 2 through 9 and 20 through 27 are set forth in Tables I and III. The azo compounds of Examples 28 through 350 can be prepared by the procedures described in the preceding examples. The azo compounds of Tables I, II and III produces blue to greenish-blue shades on polyester fibers and exhibit improved fastness to light and resistance to sublimation on polyester fibers whereas the compounds of Tables IV and V exhibit improved build-up and fastness to light, washing and/or gas and produce red to violet shades on polyester, polyamide and cellulose acetate textile materials.

TABLE I

| Example No. | R | R¹ | R² | R³ | R⁴ | R⁵ |
|---|---|---|---|---|---|---|
| 2 | CH₃OOC— | C₆H₅ | —NHCOCH₃ | H | C₂H₅ | —C₂H₅ |
| 3 | CH₃OOC— | C₆H₅ | —NHCOCH₃ | H | C₄H₁₁ | —C₂H₅ |
| 4 | CH₃OOC— | C₆H₅ | —NHCOCH₃ | —CH₃ | CH₂C₆H₅ | H |
| 5 | CH₃OOC— | C₆H₅ | —NHCOCH₃ | —OCH₃ | CH(CH₃)CH₂CH₃ | —C₂H₅ |
| 6 | CH₃OOC— | C₆H₅ | —CH₃ | H | CH₂CH₂OOCCH₃ | —CH₂CH₂Cl |
| 7 | CH₃OOC— | C₆H₅ | —NHCOCH₃ | H | CH₂CH₂OOCCH₃ | H |
| 20 | —CN | C₆H₅ | —CN | H | C₂H₅ | —C₂H₅ |
| 22 | —CN | C₆H₅ | —NHCOCH₃ | H | C₄H₁₁ | —C₂H₅ |
| 23 | —CN | C₆H₅ | —CH₃ | H | C₂H₅ | —C₂H₅ |
| 24 | —CN | C₆H₅ | —CH₃ | H | CH₂CH₂CN | —C₂H₅ |
| 25 | C₆H₅OOC— | C₆H₅ | —NHCOCH₃ | H | CH₂CH₂OOCCH₃ | —C₂H₅ |
| 26 | H₂NCO— | C₆H₅ | —NHCOCH₃ | H | C₄H₁₁ | —C₂H₅ |
| 27 | (CH₃)₂CHOOC— | C₆H₅ | —NHCOCH₃ | H | C₂H₅ | —C₂H₅ |
| 28 | (CH₃)₂CHOOC— | C₆H₅ | —NHCOCH₃ | H | CH₂C₆H₅ | —C₂H₅ |
| 29 | CH₃CH₂(CH₃)CHOOC— | C₆H₅ | —NHCOCH₃ | H | CH(CH₃)CH₂CH₃ | —C₂H₅ |
| 30 | CH₃CH₂OOC— | C₆H₅ | —NHCOCH₃ | H | CH₂C₆H₅ | —C₂H₅ |
| 31 | C₆H₁₁OOC— | C₆H₅ | —NHCOCH₃ | H | C₂H₅ | —C₂H₅ |
| 32 | CH₃OCH₂CH₂OOC— | C₆H₅ | —NHCOCH₃ | H | (CH₂)₃CH₃ | —C₂H₅ |
| 33 | NCCH₂CH₂OOC— | C₆H₅ | —NHCOCH₃ | H | CH(CH₃)CH₂CH₃ | —C₂H₅ |
| 34 | (CH₃)₂NCH₂CH₂OOC— | C₆H₅ | —NHCOCH₃ | H | CH(CH₃)CH₂CH₃ | —C₂H₅ |
| 35 | CH₃CH₂OOC— | C₆H₅ | —NHCOCH₃ | H | C₂H₅ | —C₂H₅ |
| 36 | C₄H₁₁CH₂OOC— | C₆H₅ | —NHCOCH₃ | H | C₂H₅ | —C₂H₅ |
| 37 | CH₃COOCH₂CH₂OOC— | C₆H₅ | —NHCOCH₃ | H | C₂H₅ | —C₂H₅ |
| 38 | HOCH₂CH₂OOC— | C₆H₅ | —NHCOCH₃ | H | C₂H₅ | —C₂H₅ |
| 39 | HOCH₂(HO)CHCH₂OOC— | C₆H₅ | —NHCOCH₃ | H | C₂H₅ | —C₂H₅ |
| 40 | CH₃SO₂— | C₆H₅ | —NHCOCH₃ | H | C₂H₅ | —C₂H₅ |
| 41 | C₆H₅SO₂— | C₆H₅ | —NHCOCH₃ | H | C₂H₅ | —C₂H₅ |
| 42 | C₆H₅SO₂— | C₆H₅ | —NHCOCH₃ | H | C₂H₅ | —C₂H₅ |
| 43 | C₆H₁₁SO₂— | C₆H₅ | —NHCOCH₃ | H | C₂H₅ | —C₂H₅ |
| 44 | (C₂H₅)₂NCO— | C₆H₅ | —NHCOCH₃ | H | C₂H₅ | —C₂H₅ |
| 45 | C₆H₅NHCO— | C₆H₅ | —NHCOCH₃ | H | C₂H₅ | —C₂H₅ |
| 46 | CH₃NHCO— | C₆H₅ | —NHCOCH₃ | H | C₂H₅ | —C₂H₅ |
| 47 | C₆H₁₁NHCO— | C₆H₅ | —NHCOCH₃ | H | C₂H₅ | —C₂H₅ |
| 48 | C₆H₅SO₂— | C₆H₅ | —NHCOCH₃ | H | CH(CH₃)CH₂CH₃ | —C₂H₅ |
| 49 | H—NC₆H₄—(o)—N=C— | —CH₃ | —NHCOCH₃ | H | —C₂H₅ | —C₂H₅ |
| 50 | NC— | C₆H₅ | —NHCOOCH₃ | H | C₂H₅ | —C₂H₅ |
| 51 | NC— | C₆H₅ | —NHSO₂CH₃ | H | C₂H₅ | —C₂H₅ |
| 52 | C₆H₅OOC— | C₆H₅ | —NHCONHC₂H₅ | H | C₂H₅ | —C₂H₅ |
| 53 | C₆H₅OOC— | C₆H₅ | —NHCOCH₂OH | H | CH₂CH₂OH | —C₂H₅ |
| 54 | C₆H₅OOC— | C₆H₅ | —NHCOCH₂CN | H | CH₂CH₂OH | —C₂H₅ |
| 55 | C₆H₅OOC— | C₆H₅ | —NHCOC₆H₅ | H | CH₂CH₂OOCCH₃ | —C₂H₅ |
| 56 | NC— | C₆H₅ | —NHCOCH₂OOCCH₃ | H | CH₂CH₂OOCCH₃ | —C₂H₅ |
| 57 | C₆H₅OOC— | C₆H₅—p—OCH₃ | —NHCOCH₂OCH₃ | H | (CH₂)₃CH₃ | —C₂H₅ |
| 58 | C₆H₅OOC— | C₆H₅—p—OCH₃ | —NHCOCH₂OH | H | (CH₂)₃CH₃ | —C₂H₅ |
| 59 | C₆H₅OOC— | C₆H₅—p—OCH₃ | —NHCOCH(CH₃)₂ | H | CH₂CH₂OOCCH₃ | —C₂H₅ |
| 60 | C₆H₅OOC— | C₆H₅—p—OCH₃ | —NHCOCH₃ | H | CH₂CH₂OOCCH₃ | —C₂H₅ |
| 61 | C₆H₅OOC— | C₆H₅—p—Br | —NHCOCH₃ | H | CH₂CH₂OOCCH₃ | —C₂H₅ |
| 62 | C₆H₅OOC— | C₆H₅—p—Br | —NHCOCH₃ | H | CH₂CH₂OH | —C₂H₅ |
| 63 | C₆H₅OOC— | C₆H₅—o,p—di—CH₃ | —NHCOCH₃ | H | CH₂CH₂OOCCH₃ | —C₂H₅ |
| 64 | C₆H₅(CH₃)₂(C₂H₅)CHCH₂OOC— | C₆H₅ | —NHCOCH₃ | H | CH₂CH₂OOCCH₃ | —C₂H₅ |
| 65 | C₆H₅OOC— | C₆H₅ | —NHCOCH₃ | H | CH₂CH₂OCH₃ | —C₂H₅ |
| 66 | C₆H₅OOC— | C₆H₅ | —NHCOCH₃ | H | CH₂CH₂OH | —CH₂CH₂OH |
| 67 | C₆H₅OOC— | C₆H₅ | —NHCOCH₃ | H | CH₂CH₂OH | —CH₂CH₂OH |
| 68 | NC— | C₆H₅ | —NHCOCH₃ | H | CH₂CH₂OOCCH₃ | —CH₂CH₂OOCCH₃ |
| 69 | NC— | C₆H₅ | —NHCOCH₃ | H | CH₂CH₂OOCCH₃ | —CH₂CH₂OOCCH₃ |
| 70 | NC— | C₆H₅ | —NHCOCH₃ | H | CH₂CH₂OOCCH₃ | —CH₂CH₂OOCCH₃ |
| 71 | NC— | C₆H₅ | —NHCOCH₃ | H | CH₂CH₂OH | —C₂H₅ |
| 72 | NC— | C₆H₅ | —NHCOCH₃ | H | CH₂CH₂OOCCH₃ | —C₂H₅ |
| 73 | C₂H₅OOC— | C₆H₅ | —NHCOCH₃ | H | CH₂CH₂OH | —C₂H₅ |
| 74 | C₂H₅OOC— | C₆H₅ | —NHCOCH₃ | H | CH₂CH₂OOCCH₃ | —C₂H₅ |
| 75 | C₂H₅OOC— | C₆H₅ | —NHCOCH₃ | H | CH₂CH₂OH | —CH₂C₆H₅ |
| 76 | C₂H₅OOC— | C₆H₅ | —NHCOCH₃ | H | CH₂CH₂OOCCH₃ | —CH₂C₆H₅ |
| 77 | C₂H₅OOC— | C₆H₅ | —NHCOCH₃ | H | CH₂CH₂OH | —C₆H₁₁ |
| 78 | C₂H₅OOC— | C₆H₅ | —NHCOCH₃ | H | CH₂CH₂OOCCH₃ | —C₆H₅ |
| 79 | C₂H₅OOC— | C₆H₅ | —NHCOCH₃ | H | CH₂CH₂OH | —CH₂CH₂CN |
| 80 | C₂H₅OOC— | C₆H₅ | —NHCOCH₃ | H | CH₂CH₂OOCCH₃ | —CH₂CH₂OOCCH₃ |
| 81 | C₂H₅OOC— | C₆H₅ | —NHCOCH₃ | H | CH₂CH₂CN | —CH₂CH₂OOCCH₃ |

TABLE I—Continued

| Example No. | R | R¹ | R² | R³ | R⁴ | R⁵ |
|---|---|---|---|---|---|---|
| 82 | $C_2H_5OOC-$ | $-C_6H_5$ | $-NHCOCH_3$ | H | $-CH_2CH_2CONH_2$ | $-C_2H_5$ |
| 83 | $C_2H_5OOC-$ | $-C_6H_5$ | $-NHCOCH_3$ | H | $-CH_2CH_2NHCOCH_3$ | $-C_2H_5$ |
| 84 | $C_2H_5OOC-$ | $-C_6H_5$ | $-NHCOCH_3$ | H | $-CH_2CH_2NHSO_2CH_3$ | $-C_2H_5$ |
| 85 | $C_2H_5OOC-$ | $-C_6H_5$ | $-NHCOCH_3$ | H | $-CH_2CH_2NHCOOC_2H_5$ | $-C_2H_5$ |
| 86 | $C_2H_5OOC-$ | $-C_6H_5$ | $-NHCOCH_3$ | H | $-CH_2CH_2NCOCH_2CH_2$ ⌐ | $-C_2H_5$ |
| 87 | $C_2H_5OOC-$ | $-C_6H_5$ | $-NHCOCH_3$ | H | $-CH_2CH_2NHCOC_6H_5$ | $-C_2H_5$ |
| 88 | $C_2H_5OOC-$ | $-C_6H_5$ | $-NHCOCH_3$ | H | $-CH_2CH_2SCH_3$ | $-C_2H_5$ |
| 89 | $C_2H_5OOC-$ | $-C_6H_5$ | $-NHCOCH_3$ | H | $-CH_2CH_2SO_2CH_3$ | $-C_2H_5$ |
| 90 | $C_2H_5OOC-$ | $-C_6H_5$ | $-NHCOCH_3$ | H | $-CH_2CH_2COOCH_3$ | $-C_2H_5$ |
| 91 | $C_2H_5OOC-$ | $-C_6H_5$ | $-NHCOCH_3$ | H | $-C_2H_5SC_6H_5$ | $-C_2H_5$ |
| 92 | $C_2H_5OOC-$ | $-C_6H_5$ | $-NHCOCH_3$ | H | $-CH_2CH_2N(CH_3)SO_2C_6H_5$ | $-C_2H_5$ |
| 93 | $C_2H_5OOC-$ | $-C_6H_5$ | $-NHCOCH_3$ | H | $-CH_2CH_2NCOCH_2CH_2CO$ ⌐ | $-C_2H_5$ |
| 94 | NC— | $-C_6H_5$ | $-NHCOCH_3$ | H | $-CH_2CH_2NCOCH_2CH_2CO$ ⌐ | $-C_2H_5$ |
| 95 | NC— | $-C_6H_5$ | $-NHCOCH_3$ | H | $-CH_2CH_2NCOCH_2NHCO$ ⌐ | $-C_2H_5$ |
| 96 | NC— | $-C_6H_5$ | $-NHCOCH_3$ | H | $-CH_2CH_2OOCC_2H_5$ | $-CH_2CH_2OOCC_2H_5$ |
| 97 | NC— | $-C_6H_5$ | $-NHCOCH_3$ | H | $-CH_2CH_2OOCC_2H_5$ | $-C_2H_5$ |
| 98 | NC— | $-(CH_2)_3CH_3$ | $-NHCOCH_3$ | H | $-CH_2CH_2OOCC_2H_5$ | $-(CH_2)_3CH_3$ |
| 99 | NC— | $-C_6H_5$ | $-NHCOCH_3$ | H | $-CH_2CH_2OOCC_6H_{11}$ | $-C_2H_5$ |
| 100 | NC— | $-C_6H_5$ | $-NHCOCH_3$ | H | $-CH_2CH_2OOCCH_2CH_2CN$ | $-(CH_2)_3CH_3$ |
| 101 | NC— | $-C_6H_5$ | $-NHCOCH_3$ | H | $-CH_2CH(OH)CH_2OH$ | $-(CH_2)_3CH_3$ |
| 102 | NC— | $-C_6H_5$ | $-NHCOCH_3$ | H | $-CH_2CH_2(OH)CH_2OH$ | $-(CH_2)_3CH_3$ |
| 103 | NC— | $-C_6H_5$ | $-NHCOCH_3$ | H | $-(CH_2)_2NHCOCH_3$ | $-(CH_2)_3CH_3$ |
| 104 | NC— | $-C_6H_5$ | $-NHCOCH_3$ | H | $-CH_2CH_2COCH_3$ | $-(CH_2)_3CH_3$ |
| 105 | NC— | $-C_6H_5$ | $-NHCOCH_3$ | H | $-CH_2CH_2OOCCH_2Cl$ | $-(CH_2)_3CH_3$ |
| 106 | NC— | $-C_6H_5$ | $-NHCOCH_3$ | H | $-CH_2CH_2OOCNHC_6H_5$ | $-(CH_2)_3CH_3$ |
| 107 | NC— | $-C_6H_5$ | $-NHCOCH_3$ | H | $-CH_2CH_2OOCNHC_6H_5$ | $-(CH_2)_3CH_3$ |
| 108 | NC— | $-C_6H_5$ | $-NHCOCH_3$ | H | $-CH_2CH_2NHCONHC_2H_5$ | $-(CH_2)_3CH_3$ |
| 109 | NC— | $-C_6H_5$ | $-NHCOCH_3$ | H | $-CH_2CH_2OC_2H_5$ | $-(CH_2)_3CH_3$ |
| 110 | NC— | $-C_6H_5$ | $-NHCOCH_3$ | H | $-CH_2C_6H_5$ | $-C_2H_5$ |
| 111 | NC— | $-C_6H_5$ | $-NHCOCH_3$ | H | $-CH_2C_6H_4-p-COOCH_3$ | $-C_2H_5$ |
| 112 | NC— | $-C_6H_5$ | $-NHCOCH_3$ | H | $-CH_2C_6H_4-p-COOCH_3$ | $-C_2C_6H_5$ |
| 113 | NC— | $-C_6H_5$ | $-NHCOCH_3$ | H | $-CH_2CH=CH_2$ | $-CH_2OH$ |
| 114 | NC— | $-C_6H_5$ | $-NHCOCH_3$ | H | $-CH_2CH_2C_6H_5$ | $-CH_2OH$ |
| 115 | NC— | $-C_6H_5$ | $-NHCOCH_3$ | H | $-C_6H_{11}$ | $-(CH_2)_3CH_3$ |
| 116 | NC— | $-C_6H_5$ | $-NHCOCH_3$ | H | $-CH_2CH(CH_3)CH_2CH_3$ | $-CH(CH_3)CH_2CH_3$ |
| 117 | NC— | $-C_6H_5$ | $-NHCOCH_3$ | H | $-CH_2CH(CH_3)_2$ | $-CH_2C_6H_5$ |
| 118 | NC— | $-C_6H_5$ | $-NHCOCH_3$ | $-CH_3$ | $-CH_2CH(CH_3)CH_2CH_3$ | H |
| 119 | NC— | $-C_6H_5$ | $-NHCOCH_3$ | $-CH_3$ | $-CH_2C=CH-CH=CH-O$ ⌐ | H |
| 120 | NC— | $-C_6H_5$ | $-NHCOCH_3$ | $-CH_3$ | $-(CH_2)_3CH_3$ | H |
| 121 | NC— | $-C_6H_5$ | $-NHCOCH_3$ | $-CH_3$ | $-C_2H_5$ | $-C_2H_5$ |
| 122 | NC— | $-C_6H_5$ | $-NHCOCH_3$ | $-CH_3$ | $-CH_2C_6H_5$ | H |
| 123 | NC— | $-C_6H_5$ | $-NHCOCH_3$ | $-CH_3$ | $-C_6H_{11}$ | H |
| 124 | $C_2H_5OOC-$ | $-C_6H_5$ | $-NHCOCH_3$ | $-CH_3$ | $-CH_2CH_2CN$ | H |
| 125 | $CH_3OOC-$ | $-C_6H_5$ | $-NHCOCH_3$ | $-CH_3$ | $-CH_2CH_2OOCCH_3$ | H |
| 126 | $CH_3OOC-$ | $-C_6H_5$ | $-NHCOCH_3$ | $-CH_3$ | $-CH_2CH_2OOC_2H_5$ | H |
| 127 | $CH_3OOC-$ | $-C_6H_5$ | $-NHCOCH_3$ | $-CH_3$ | $-C_6H_{10}-p-CH_3$ | H |
| 128 | $CH_3OOC-$ | $-C_6H_5$ | $-NHCOCH_3$ | $-CH_3$ | $-CH(CH_3)CH_2CH_3$ | H |
| 129 | NC— | $-C_6H_5$ | $-NHCOCH_3$ | $-OCH_3$ | $-(CH_2)_3CH_3$ | H |
| 130 | NC— | $-C_6H_5$ | $-NHCOCH_3$ | $-OCH_3$ | $-CH_2CH_2OH$ | H |
| 131 | NC— | $-C_6H_5$ | $-NHCOCH_3$ | $-OCH_3$ | $-CH_2CH_2OH$ | H—$C_2H_5$ |
| 132 | NC— | $-C_6H_5$ | $-NHCOCH_3$ | $-OCH_3$ | $-CH_2CH_2OOCCH_3$ | H |
| 133 | NC— | $-C_6H_5$ | $-NHCOCH_3$ | $-OCH_3$ | $-CH_2CH_2OOCC_2H_5$ | H |
| 134 | NC— | $-C_6H_5$ | $-NHCOCH_3$ | $-OCH_3$ | $-CH_2CH_2OOCCOC_2H_5$ | $-CH_2CH_2OH$ |
| 135 | NC— | $-C_6H_5$ | $-NHCOCH_3$ | H | $-CH_2CH_2OOCOC_2H_5$ | $-CH_2CH_2OOCOC_2H_5$ |

| | | | | |
|---|---|---|---|---|
| 136 | NC— | C₆H₅ | —NHCOCH₃ | H | H |
| 137 | NC— | C₆H₅ | —NHCOCH₃ | H | C₆H₅ |
| 138 | NC— | C₆H₅ | —NHCOCH₃ | H | —C₂H₅ |
| 139 | NC— | C₆H₅ | —NHCOCH₃ | H | —C₂H₅ |
| 140 | NC— | C₆H₅ | —NHCOCH₃ | H | —C₂H₅ |
| 141 | NC— | C₆H₅ | —NHCOCH₃ | H | —CH₂CH₂OH |
| 142 | NC— | C₆H₅ | —NHCOCH₃ | H | —CH₂CH₂OOCCH₃ |
| 143 | NC— | C₆H₅ | —NHCOCH₃ | H | —CH₂CH₂OOCCH₃ |
| 144 | C₂H₅OOC— | C₆H₅ | —NHCOCH₃ | H | —CH₂C₆H₅ |
| 145 | C₂H₅OOC— | C₆H₅ | —NHCOCH₃ | H | —CH₃ |
| 146 | C₂H₅OOC— | C₆H₅ | —NHCOCH₃ | H | —C₆H₅ |
| 147 | C₂H₅OOC— | C₆H₅ | —NHCOCH₃ | H | H |
| 148 | C₂H₅OOC— | C₆H₅ | —NHCOCH₃ | —SCH₃ | —C₆H₅ |
| 149 | C₂H₅OOC— | C₆H₅ | —NHCOCH₃ | H | —CH₂CH(OH)CH₂OH |
| 150 | C₂H₅OOC— | C₆H₅ | —NHCOCH₃ | —OCH₂CH₂OH | —C₂H₅ |
| 151 | C₂H₅OOC— | C₆H₅ | —NHCOCH₃ | —OCH₃ | —C₂H₅ |
| 152 | C₂H₅OOC— | C₆H₅ | —NHCOCH₃ | —NHCOCH₃ | —C₂H₅ |
| 153 | C₂H₅OOC— | C₆H₅ | —NHCOCH₃ | H | H |
| 154 | C₂H₅OOC— | C₆H₅ | —NHCOCH₃ | H | —C₂H₅ |
| 155 | C₂H₅OOC— | C₆H₅ | —OCH₃ | —OCH₃ | —C₂H₅ |
| 156 | C₂H₅OOC— | C₆H₅ | —OCH₃ | —CH₃ | —C₂H₅ |
| 157 | NC— | C₆H₅ | —CH₃ | —OCH₃ | —C₂H₅ |
| 158 | CH₃OOC— | C₆H₅ | —CH₃ | —CH₃ | —C₂H₅ |
| 159 | NC— | C₆H₅ | —CH₃ | H | —C₂H₅ |
| 160 | NC— | C₆H₅ | —CH₃ | H | —C₂H₅ |
| 161 | NC— | C₆H₅ | —CH₃ | H | —C₂H₅ |
| 162 | CH₃OOC— | C₆H₅ | —CH₃ | H | —C₂H₅ |
| 163 | HOCH₂CH₂OOC— | C₆H₅ | —CH₃ | H | —CH₂CH(OH)CH₂OH |
| 164 | NCCH₂CH₂OOC— | C₆H₅ | —CH₃ | H | —CH₂CH(OH)CH₂OH |
| 165 | CH₃OCH₂CH₂OOC— | C₆H₅ | —CH₃ | H | —CH₂CH(OH)CH₂OH |
| 166 | CH₃OOC— | C₆H₅ | —CH₃ | H | —CH₂CH(OH)CH₂OH |
| 167 | CH₃OOC— | C₆H₅ | —CH₃ | H | —CH₂CH(OH)CH₂OH |
| 168 | CH₃OOC— | C₆H₅ | —CH₃ | H | —CH₂CH(OH)CH₂OH |
| 169 | CH₃OOC— | C₆H₅ | —CH₃ | H | —CH₂CH(OH)CH₂OH |
| 170 | CH₃OOC— | C₆H₅ | —CH₃ | H | —CH₂CH(OH)CH₂Cl |
| 171 | CH₃OOC— | C₆H₅ | —CH₃ | H | —CH₂CONH₂ |
| 172 | C₂H₅OOC— | C₆H₅ | —CH₃ | H | —CH₂CH₂NHCOCH₃ |
| 173 | C₂H₅OOC— | C₆H₅ | —CH₃ | H | —CH₂CH₂OOCCH₃ |
| 174 | NC— | C₆H₅ | H | H | —C₂H₅ |
| 175 | NC— | C₆H₅ | Cl | H | —C₂H₅ |
| 176 | NC— | C₆H₅ | —SCH₃ | H | —C₂H₅ |
| 177 | NC— | C₆H₅ | —CH₃ | H | —C₂H₅ |
| 178 | NC— | C₆H₅ | —CH₃ | H | —C₂H₅ |
| 179 | NC— | C₆H₅ | —CH₃ | H | —C₂H₅ |
| 180 | NC— | C₆H₅ | —CH₃ | H | —C₆H₅ |
| 181 | NC— | C₆H₅ | —CH₃ | H | —C₂H₅ |
| 182 | NC— | C₆H₅ | —CH₃ | H | —C₂H₅ |
| 183 | NC— | C₆H₅ | —CH₃ | H | —CH₃ |
| 184 | NC— | C₆H₅ | —OCH₃ | H | —C₂H₅ |
| 185 | NC— | C₆H₅ | —OCH₃ | H | —C₂H₅ |
| 186 | NC— | C₆H₅ | —OCH₃ | H | —CH₃ |
| 187 | NC— | C₆H₅ | —OCH₃ | H | —CH₂CH₂OH |
| 188 | NC— | C₆H₅ | —OH | H | —CH₂CH₂OH |
| 189 | NC— | C₆H₅ | —OOCCH₃ | H | —CH₂CH₂OOCCH₃ |
| 190 | NC— | C₆H₅ | —CHCOOCH₃ | H | —C₆H₅ |
| 191 | C₂H₅OOC— | C₆H₅ | —CHCOOCH₃ | H | —C₆H₅ |
| 192 | NC— | C₆H₅ | —NHCOCH₃ | H | H |
| 193 | NC— | C₆H₅ | —NHCOCH₃ | H | H |

TABLE II

| Example No. | R | R¹ | R² | R³ | Z |
|---|---|---|---|---|---|
| 194 | NC— | —C₆H₅ | H | H | —O— |
| 195 | CH₃OOC— | —C₆H₅ | H | H | —O— |
| 196 | NC— | —C₆H₅ | —CH₃ | H | —O— |
| 197 | NC— | —C₆H₅ | —NHCOCH₃ | H | —O— |
| 198 | NC— | —C₆H₅ | —NHCOOC₂H₅ | H | —O— |
| 199 | NC— | —C₆H₅ | —CH₃ | H | —CH₂— |
| 200 | NC— | —C₆H₅ | H | H | —CH₂— |
| 201 | NC— | —C₆H₅ | —OCH₃ | H | —O— |
| 202 | NC— | —C₆H₅ | —CH₃ | H | \N—COCH₃ / |
| 203 | NC— | —C₆H₅ | —CH₃ | H | \N—SO₂CH₃ / |
| 204 | NC— | —C₆H₅ | —CH₃ | H | \N—SO₃C₆H₅ / |
| 205 | NC— | —C₆H₅ | —CH₃ | H | \N—COOC₂H₅ / |
| 206 | CH₃OOC— | —C₆H₅ | —NHCOCH₃ | H | —O— |
| 207 | C₂H₅OOC— | —C₆H₅ | —NHCOCH₃ | H | —O— |
| 208 | (CH₃)₂CHOOC— | —C₆H₅ | —NHCOCH₃ | H | —O— |
| 209 | CH₃CH₂CH(CH₃)OOC— | —C₆H₅ | —NHCOCH₃ | H | —O— |
| 210 | CH₃OOC— | —C₆H₅ | —CH₃ | H | —SO₂— |
| 211 | CH₃CH₂OOC— | —C₆H₅ | —CH₃ | H | —SO₂— |
| 212 | CH₃CH₂OOC— | —C₆H₅ | —CH₃ | —CH₃ | —SO₂— |
| 213 | CH₃CH₂OOC— | —C₆H₅ | —OCH₃ | H | —SO₂— |
| 214 | CH₃CH₂OOC— | —C₆H₅ | —NHCOCH₃ | H | —SO₂— |
| 215 | NC— | —C₆H₅ | —NHCOCH₃ | H | —SO₂— |
| 216 | NC— | —C₆H₅ | —NHCOCH₃ | —OCH₃ | —SO₂— |
| 217 | NC— | —C₆H₅ | —CH₃ | —OCH₃ | —S— |
| 218 | NC— | —C₆H₅ | —CH₃ | —OCH₃ | —SO— |
| 219 | NC— | —C₆H₅ | —NHCOCH₃ | —OCH₃ | —S— |
| 220 | NC— | —C₆H₅ | H | —OCH₃ | —S— |

TABLE III

| Ex. No. | R | R¹ | R² | R³, R⁶, R⁷, R⁸ | R⁴ |
|---|---|---|---|---|---|
| 8 | CH₃OOC— | —C₆H₅ | —CH₃ | 2-CH₃ | —CH₂CH₂NHCOCH₃ |
| 9 | CH₃OOC— | —C₆H₅ | —NHCOCH₃ | H | —C₂H₅ |
| 221 | CH₃OOC— | —C₆H₅ | —CH₃ | 2-CH₃ | —CH₂CH₂OH |
| 222 | CH₃OOC— | —C₆H₅ | —CH₃ | 2-CH₃ | —CH₂CH(OH)CH₂OH |
| 223 | CH₃OOC— | —C₆H₅ | —CH₃ | 2-CH₃ | —(CH₂)₃NHCOCH₃ |
| 224 | CH₃OOC— | —C₆H₅ | —CH₃ | 2-CH₃ | —CH₂CH₂CONH₂ |
| 225 | CH₃OOC— | —C₆H₅ | —CH₃ | 2-CH₃ | —C₂H₅ |
| 226 | CH₃OOC— | —C₆H₅ | —CH₂ | 2-CH₃ | —CH₂CH₂OOCCH₃ |
| 227 | CH₃OOC— | —C₆H₅ | —CH₃ | 2-CH₃ | —CH₂CH₂Cl |
| 228 | CH₃OOC— | —C₆H₅ | —CH₃ | 2-CH₃ | —CH₂CH₂CN |
| 229 | NC— | —C₆H₅ | —CH₃ | 2-CH₃ | —CH₂CH₂CN |
| 230 | NC— | —C₆H₅ | —CH₃ | 2-CH₃ | —CH₂C₆H₅ |
| 231 | NC— | —C₆H₅ | —CH₃ | 2-CH₃ | —C₆H₁₁ |
| 232 | NC— | —C₆H₅ | —CH₃ | 2,2,4-tri-CH₃ | —CH₂CH₂OC₂H₅ |
| 233 | NC— | —C₆H₅ | —CH₃ | 2,2,4-tri-CH₃ | —CH₂CH₂OH |
| 234 | NC— | —C₆H₅ | —CH₃ | 2,2,4-tri-CH₃ | —CH₂CH₂Cl |
| 235 | NC— | —C₆H₄-p-OC₄H₉ | —CH₃ | 2,2,4-tri-CH₃ | —CH₂CH₂OOCCH₃ |
| 236 | NC— | —C₆H₄-p-CH₃ | —CH₃ | 2,2,4-tri-CH₃ | —C₂H₅ |
| 237 | NC— | —C₆H₄-p-CH₃ | H | 2,2,4-tri-CH₃ | —C₂H₅ |
| 238 | NC— | —C₆H₅ | H | 2,2,4-tri-CH₃ | —CH₂CH₂OOCCH₃ |
| 239 | NC— | —C₆H₅ | H | 2,2,4-tri-CH₃ | —CH₂CH₂OH |
| 240 | NC— | —C₆H₅ | —OCH₃ | 2,2,4-tri-CH₃ | —C₂H₅ |
| 241 | NC— | —C₆H₅ | —NHCOCH₃ | 2-CH₃ | —C₂H₅ |
| 242 | NC— | —C₆H₅ | —NHCOCH₃ | 2-CH₃ | —CH₂CH₂OH |
| 243 | NC— | —C₆H₅ | —NHCOCH₃ | 2-CH₃ | —CH₂CH₂OOCCH₃ |
| 244 | NC— | —C₆H₅ | —NHCOCH₃ | 2-CH(CH₃)₂ | —C₂H₅ |
| 245 | NC— | —C₆H₅ | —NHCOCH₃ | 2-CH(CH₃)₂ | —CH₂C₆H₅ |
| 246 | NC— | —C₆H₅ | —NHCOCH₃ | 2,2,4-tri-CH₃ | —CH₂C₆H₅ |
| 247 | NC— | —C₆H₅ | —NHCOCH₃ | 2,2,4-tri-CH₃ | —C₂H₅ |
| 248 | NC— | —C₆H₅ | —NHCOCH₃ | 2,2,4-tri-CH₃ | —CH₂CH₂OOCCH₃ |
| 249 | CH₃OOC— | —C₆H₅ | —NHCOCH₃ | 2,2,4-tri-CH₃ | —CH₂CH₂OOCC₂H₅ |
| 250 | CH₃OOC— | —C₆H₅ | —NHCOCH₃ | 2,2,4-tri-CH₃ | —CH₂CH₂OOCC₅H₁₁ |
| 251 | CH₃OOC— | —C₆H₅ | —NHCOCH₃ | 2,2,4-tri-CH₃ | —CH₂CH₂OOCCH₂CN |
| 252 | CH₃OOC— | —C₆H₅ | —NHCOCH₃ | 2,2,4-tri-CH₃ | —CH₂CH₂OOCCH₂C₆H₅ |
| 253 | CH₃OOC— | —C₆H₅ | —NHCOCH₃ | 2,2,4-tri-CH₃ | —CH₂CH₂OOC—C₆H₄-p-COOCH₃ |
| 254 | CH₃OOC— | —C₆H₅ | —NHCOCH₃ | 2,2,4-tri-CH₃ | —CH₂CH₂NCOCH₂CH₂CO |
| 255 | CH₃OOC— | —C₆H₅ | —NHCOCH₃ | 2,2,4-tri-CH₃ | —CH₂CH₂CONH₂ |
| 256 | CH₃OOC— | —C₆H₅ | —NHCOCH₃ | 2,2,4-tri-CH₃ | —(CH₂)₃OOCC₆H₅ |
| 257 | CH₃OOC— | —C₆H₅ | —NHCOOC₂H₅ | 2,2,4-tri-CH₃ | —C₂H₅ |
| 258 | NC— | —C₆H₅ | —NHCOOC₂H₅ | 2,2,4-tri-CH₃ | —C₂H₅ |
| 259 | NC— | —C₆H₅ | —NHCOC₆H₅ | 2,2,4-tri-CH₃ | —CH₂CH₂OOCH₃ |
| 260 | NC— | —C₆H₅ | —NHCOC₆H₅ | 2,2,4-tri-CH₃ | —CH₂CH₂OOCH₃ |
| 261 | NC— | —C₆H₅ | —NHCOCH₂C₆H₅ | 2,2,4-tri-CH₃ | —C₂H₅ |
| 262 | NC— | —C₆H₅ | —NHCOCH₂C₆H₅ | 2,2,4-tri-CH₃ | —C₂H₅ |
| 263 | NC— | —C₆H₅ | —NHCOC₆H₅ | 2,2,4-tri-CH₃ | —(CH₂)₃CH₃ |
| 264 | NC— | —C₆H₅ | —NHCOCH₂Cl | 2,2,4-tri-CH₃ | —CH₂CH(C₂H₅)CH₂CH₂CH₂OH |
| 265 | NC— | —C₆H₅ | —NHCONHC₂H₅ | 2,2,4-tri-CH₃ | —C₂H₅ |
| 266 | NC— | —C₆H₅ | —NHSO₂CH₃ | 2,2,4-tri-CH₃ | —C₂H₅ |
| 267 | NC— | —C₆H₅ | —NH₂COCH₂OH | 2,2,4-tri-CH₃ | —C₂H₅ |
| 268 | NC— | —C₆H₅ | —NH₂COC₆H₁₁ | 2,2,4-tri-CH₃ | —C₂H₅ |
| 269 | NC— | —C₆H₅ | —NHCOCH(CH₃)₂ | 2,2,4-tri-CH₃ | —C₂H₅ |
| 270 | NC— | —C₆H₅ | —CH₃ | —CH₃2,2,4-tri-CH₃ | —CH₂CH₂CH₂SO₂CH₃ |
| 271 | NC— | —C₆H₅ | H | 2,2,4-tri-CH₃ | —CH₂CH₂CH₂SO₂CH₃ |
| 272 | NC— | —C₆H₅ | H | 2,2,4,5,8-penta-CH₃ | —C₂H₅ |
| 273 | NC— | —C₆H₅ | —CH₃ | 2,2,4-tri-CH₃ | —CH₂CH₂OOCCH₂OCH₃ |
| 274 | NC— | —C₆H₅ | —CH₃ | 2,2,4-tri-CH₃ | —CH₂CH₂OOCOC₂H₅ |
| 275 | NC— | —C₆H₅ | —CH₃ | 2,2,4-tri-CH₃ | —CH₂CH₂OOCC₆H₅ |

TABLE IV

| Example No. | $R^1$ | $R^2$ | $R^3$ | $R^4$ | $R^5$ |
|---|---|---|---|---|---|
| 276 | $C_6H_5$ | $CH_3$ | H | $-C_6H_{11}$ | $-CH_2CH_2OH$ |
| 277 | $C_6H_5$ | $CH_3$ | H | $-C_6H_{11}$ | $-CH_2CH(OH)CH_2OH$ |
| 278 | $C_6H_5$ | $CH_3$ | H | $-C_2H_5$ | $-CH_2CH(OCOCH_3)CH_2OCOCH_3$ |
| 279 | $C_6H_5$ | $CH_3$ | H | $-C_2H_5$ | $-CH_2CH(OH)CH_2OH$ |
| 280 | $C_6H_5$ | $CH_3$ | H | $-CH_2CH_2OH$ | $-CH_2CH_2OH$ |
| 281 | $C_6H_5$ | $CH_3$ | H | $-CH_2CH_2OCOCH_3$ | $-CH_2CH_2OCOCH_3$ |
| 282 | $C_6H_5$ | $CH_3$ | H | $-CH_2CH_2OCOOC_2H_5$ | $-CH_2CH_2OCOOC_2H_5$ |
| 283 | $C_6H_5$ | $CH_3$ | H | $-CH_2CH_3$ | $-CH_2CH_2OCOC_2H_5$ |
| 284 | $C_6H_5$ | $CH_3$ | H | $-CH_2CH_3$ | $-CH_2CH_2OCOCH_2Cl$ |
| 285 | $C_6H_5$ | $CH_3$ | H | $-CH_2CH_3$ | $-CH_2CH_2OCOCH_2OCH_3$ |
| 286 | $C_6H_5$ | $CH_3$ | H | $-CH_2CH_3$ | $-CH_2CH(OH)CH_2Cl$ |
| 287 | $C_6H_5$ | $CH_3$ | H | $-CH_2CH_3$ | $-CH_2CH(Cl)CH_2Cl$ |
| 288 | $C_6H_5$ | $CH_3$ | H | $-CH_2CH_2OCH_3$ | $-CH_2CH_2OH$ |
| 289 | $C_6H_5$ | $CH_3$ | H | $-CH_2CH_3$ | $-CH_2CH(OH)CH_3$ |
| 290 | $C_6H_5$ | Cl | H | $-CH_2CH_2OH$ | $-CH_2CH_2OH$ |
| 291 | $p-CH_3-C_6H_4$ | $CH_3$ | H | $-CH_2CH_3$ | $-CH_2CH_2OCOCH_3$ |
| 292 | $p-CH_3O-C_6H_4$ | $CH_3$ | H | $-CH_2CH_3$ | $-CH_2CH_2OCOCH_3$ |
| 293 | $C_6H_5$ | $OCH_3$ | H | $-CH_2CH_3$ | $-CH_2CH_2OCOCH_3$ |
| 294 | $C_6H_5$ | $NHCOCH_3$ | H | $-CH_2CH_2OH$ | $-CH_2CH_2OH$ |
| 295 | $C_6H_5$ | $NHCOCH_3$ | H | $-CH_2CH_3$ | $-CH_2CH_2OH$ |
| 296 | $C_6H_5$ | $NHCOCH_3$ | H | $-CH_2CH_3$ | $-CH_2CH(OH)CH_3$ |
| 297 | $C_6H_5$ | $NHCOCH_3$ | H | $-CH_2CH_3$ | $-CH_2CH_2OCOCH_3$ |
| 298 | $C_6H_5$ | $NHCOCH_3$ | H | $-CH_2CH_3$ | $-CH_2CH(OH)CH_2OH$ |
| 299 | $C_6H_5$ | $NHCOCH_3$ | $CH_3$ | H | $-CH_2CH(OH)CH_2OH$ |
| 300 | $C_6H_5$ | $NHCOCH_3$ | $CH_3$ | H | $-CH_2CH_2OH$ |
| 301 | $C_6H_5$ | $NHCOCH_2OH$ | H | $-CH_2CH_3$ | $-CH_2CH_3$ |
| 302 | $C_6H_5$ | $NHCOCH_2OCH_3$ | H | $-CH_2CH_3$ | $-CH_2CH_3$ |
| 303 | $C_6H_5$ | $NHCOCH_2OH$ | H | $-CH_2CH_2OH$ | $-CH_2CH_2OH$ |
| 304 | $C_6H_5$ | $NHCOC_2H_5$ | H | $-CH_2CH_3$ | $-CH_2CH(OH)CH_2Cl$ |
| 305 | $C_6H_5$ | $NHCOC_2H_5$ | H | $-CH_2CH_3$ | $-CH_2CH(OH)CH_2OCH(CH_3)_2$ |
| 306 | $C_6H_5$ | $CH_3$ | H | $-CH_2CH_3$ | $-CH_2CH(OH)CH_2OCH_3$ |
| 307 | $C_6H_5$ | H | H | $-CH_2CH_3$ | $-CH_2CH(OH)CH_2OH$ |
| 308 | $C_6H_5$ | $OCH_3$ | $CH_3$ | $-CH_2CH_2OH$ | $-CH_2CH_2OH$ |
| 309 | $C_6H_5$ | $3-CH_3$ | H | $-CH_2CH_3$ | $-CH_2CH_2NHCOCH_3$ |
| 310 | $C_6H_5$ | $3-CH_3$ | H | $-CH_2CH_3$ | $-CH_2CH_2CH_2SO_2CH_3$ |
| 311 | $C_6H_5$ | $3-CH_3$ | H | $-CH_2CH_3$ | $-CH_2CH_2OCH_3$ |
| 312 | $C_6H_5$ | $3-CH_3$ | H | $-CH_2CH_3$ | $-CH_2CH_2NHCOCH_2OH$ |
| 313 | $C_6H_5$ | $3-CH_3$ | H | $-CH_2CH_3$ | $-CH_2CH_2OCH_2CH_2CN$ |
| 314 | $C_6H_5$ | $CH_3$ | H | $-CH_2CH_3$ | $-CH_2CH_2OCH_2CH_2OCH_3$ |
| 315 | $C_6H_5$ | $NHCOCH_3$ | H | $-CH_2CH_3$ | $-CH_2CH_2CN$ |
| 316 | $C_6H_5$ | $NHCOCH_3$ | H | $-CH_2CH_3$ | $-CH_2CH_2OOCC_6H_5$ |
| 317 | $C_6H_5$ | $NHCOCH_3$ | H | $-CH_2CH_3$ | $-CH_2CH_2OCOOCH_3$ |
| 318 | H | $CH_3$ | H | $-CH_2CH_3$ | $-CH_2CH_2OCOCH_3$ |
| 319 | $CH_3$ | $CH_3$ | H | $-CH_2CH_3$ | $-CH_2CH_2OCOCH_3$ |
| 320 | $C_6H_5$ | $CH_3$ | H | $-CH_2CH_2CN$ | $-CH_2CH_2OCOCH_3$ |
| 321 | $C_6H_5$ | H | H | $-CH_2CH_2CN$ | $-CH_2CH_2OCOCH_3$ |
| 322 | $C_6H_5$ | H | $CH_3$ | H | $-CH_2CH_2NHCOCH_3$ |
| 323 | $C_6H_5$ | H | $CH_3$ | H | $-CH_2CH_2OCOCH_3$ |
| 324 | $C_6H_5$ | $CH_3$ | H | $-CH_2CH_3$ | $-CH_2CH_2COOCH_3$ |
| 325 | $C_6H_5$ | $CH_3$ | H | $-CH_2CH_3$ | $-CH_2CH_2CONH_2$ |

TABLE V

| Example No. | $R^1$ | $R^2$ | $R^3, R^6, R^7, R^8$ | $R^4$ |
|---|---|---|---|---|
| 326 | $-C_6H_5$ | $-CH_3$ | $2-CH_3$ | $-CH_2CH_2OH$ |
| 327 | $-C_6H_5$ | $-CH_3$ | $2-CH_3$ | $-CH_2CH_2NHCOCH_3$ |
| 328 | $-C_6H_5$ | $-CH_3$ | $2,2,4-tri-CH_3$ | $-C_2H_5$ |
| 329 | $-C_6H_5$ | $-Cl$ | $2,2,4-tri-CH_3$ | $-CH_2CH_2OOCCH_3$ |
| 330 | $-C_6H_5$ | $-CH_3$ | $2,2,4-tri-CH_3$ | $-CH_2CH(OH)CH_2OH$ |
| 331 | $-C_6H_5$ | $-NHCOCH_3$ | H | $-CH_2CH_2OH$ |
| 332 | $-C_6H_5$ | $-NHCOCH_3$ | $2-CH_3$ | $-CH_2CH_2OCH_3$ |
| 333 | $-C_6H_5$ | $-CH_3$ | $2-CH_3$ | $-CH_2CH_2OCH_3$ |
| 334 | $-C_6H_5$ | $-CH_3$ | $2-CH_3$ | $-CH_2CH_2CN$ |
| 335 | $-C_2H_5$ | $-OCH_3$ | $2,2,4-tri-CH_3$ | $-CH_2CH_2NHSO_2CH_3$ |
| 336 | $-C_2H_5$ | $-CH_3$ | $2,2,4-tri-CH_3$ | $-CH_2CH(OH)CH_2Cl$ |
| 337 | $-C_6H_5$ | $-CH_3$ | $2,2,4-tri-CH_3$ | $-CH_2CH_2Cl$ |
| 338 | $-C_6H_5$ | H | $2,2,4-tri-CH_3$ | $-C_2H_5$ |
| 339 | $-C_6H_5$ | H | $2-CH_3$ | $-(CH_2)_3CH_3$ |
| 340 | $-C_6H_5$ | $-CH_3$ | $2-CH_3$ | $-C_6H_{11}$ |
| 341 | $-C_6H_5$ | $-CH_3$ | $2-CH_3$ | $-CH_2CH_2OOCCH_3$ |
| 342 | $-C_6H_5$ | H | $2,2,4-5-tetra-CH_3$ | $-C_6H_{11}$ |
| 343 | $-C_6H_5$ | H | $8-CH_3$ | $-(CH_2)_3NHCOC_6H_5$ |
| 344 | $-C_6H_5$ | $-CH_3$ | $2-CH_3$ | $-C_6H_{11}$ |
| 345 | $-C_6H_5$ | $-CH_3$ | $2,2,4-tri-CH_3$ | $-CH_2CH_2OH$ |
| 346 | $-C_6H_5$ | $-CH_3$ | $2,2,4-tri-CH_3$ | $-CH_2CH(OH)CH_2OH$ |
| 347 | $-C_6H_5$ | $-CH_3$ | $2,2,4-tri-CH_3$ | $-CH_2CH_2OOCC_6H_5$ |
| 348 | $-C_6H_5$ | $-CH_3$ | $2,2,4-tri-CH_3$ | $-CH_2CH_2OOCOC_2H_5$ |
| 349 | $-C_6H_5$ | $-CH_3$ | $2,2,4-tri-CH_3$ | $-CH_2CH(OCH_3)CH_2OCH_3$ |
| 350 | $-C_6H_5$ | $-CH_3$ | $2,2,4-tri-CH_3$ | $-CH_2CH_2OOCC_2H_5$ |

The compounds of the invention can be applied to polyester, polyamide and cellulose acetate fibers by known disperse dyeing techniques employing carriers, surfactants, dispersing agents, etc. Dyeing can be conducted at atmospheric or super-atmospheric pressures. The following example illustrates a carrier dyeing procedure for applying the azo compounds of the invention to dye polyester textile materials.

EXAMPLE 351

An amount of 0.1 g. of the azo compound of Example 1 is dissolved in 10 cc. of 2-methoxyethanol. A small amount (3–5 cc.) of a 3% sodium lignin sulfonate aqueous solution is added, with stirring, and then the volume of the bath is brought to 300 cc. with water. 3 cc. of an anionic solvent carrier (Tanavol) is added to the bath and 10 g. of a textile fabric made of poly(ethylene terephthalate) fibers is placed in the bath and worked 10 minutes without heat. The dyeing is carried out at the boil for one hour. The dyed fabric is removed from the dyebath and scoured for 20 minutes at 80° C. in a solution containing 1 g./l. neutral soap and 1 g./l. sodium carbonate. The fabric is then rinsed, dried in an oven at 250° F. and heat set (for removal of residual carrier) for 5 minutes at 350° C.

When the compounds of the invention are used to dye polyamide textile materials, the above procedure can be employed except that the carrier need not be used. When dyeing cellulose acetate fibers with our novel azo compounds, the general procedure described in Example 351 can be used except that the carrier should not be used and the dyeing should be carried out at 80° C. for one hour rather than at the boil.

The compounds of the invention can also be applied to polyester textile materials by the heat-fixation technique described in U.S. Pat. 2,663,612 and in the American Dyestuff Reporter, 42, 1 (1953). The following procedure describes how the azo compounds of the invention can be applied to polyester materials by the heat-fixation technique.

EXAMPLE 352

A mixture of 500 mg. of the compound of Example 2, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a micro-size container (an accessory for a 1-quart size Szegvari Attritor) for approximately 3.5 hours. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring. A thickener and penetrating mixture is prepared by mixing 1 ml. of a complex diaryl sulfonate surfactant (Compound 8–S), 3 ml. of a 3% solution of a sodium N-methyl-N-oleoyltaurate (Igepon T–S1), 8 ml. of a 25% solution of natural gums (Superclear 80N), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the reservoir of a Butterworth padder where it is heated to about 45–60° C.

10 g. of a fabric of poly(ethylene terephthalate) fibers and 10 g. of a fabric of 65/35 spun poly(ethylene terephthalate)/cotton fibers are sewn together, end-to-end, and padded for 5 minutes of continuous cycling through the dye mixture and between three ruber squeeze rollers of the padder. Dye mixture pick-up is about 60% based on the weight of the fabrics. The padded fabrics are then dried at 200° F. and then heat-fixed for 2 minutes at 415° F. in a forced air oven. The dyed fabrics are scoured for 20 minutes at 65–70° C. in a solution containing 0.2% sodium hydrosulfite, 0.2% sodium carbonate and 1.7% of a 3% solution of sodium N-methyl-N-oleoyltaurate and then dried. The fabrics possess excellent brightness and exhibit outstanding fastness to light and sublimation when tested according to the procedures described in the 1966 edition of the Technical Manual of the American Association of Textile Chemists and Colorists.

The heat-fixation dyeing procedure described above can be varied by the substitution of other dispersing agents, surfactants, suspending agents, thickeners, etc. The temperature and time of the heat-fixation step can also be varied.

Polymeric linear polyester materials of the terephthalate sold under the trademarks "Kodel," "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,446. Poly(ethylene terephthalate) polyester fibers are described, for example, in U.S. Pat. 2,465,319. The polymeric linear polyster materials disclosed in U.S. Pats. 2,945,010, 2,957,745 and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These intrinsic viscosities are measured at 25° C. using 0.25 g. polymer per 100 ml. of a solvent consisting of 60% phenol and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc.

Examples of the polyamide fiber that can be dyed with the novel azo compounds are those having a basis of a synthetic linear polyamide such as nylon 66 (polyhexamethylene adipamide) manufactured by the polymerization of adipic acid and hexamethylene diamine, nylon 6 (polycaprolactam) prepared from epsilon-aminocaproic acid lactam (caprolactam), and nylon 8. A detailed description of the synthetic polyamide materials which are dyed in fast shades by the compounds of the invention is set forth in U.S. Pat. 3,100,134. The cellulose acetate fibers dyed with our azo compounds include fibers spun from cellulose triacetate and partially-hydrolyzed cellulose acetate.

The invention has been described in considerable detail with particular reference to preferred embodiments thereof, but it will be understood that variations and modifications can be effected within the spirit and scope of the invention.

We claim:
1. A water-insoluble compound having the formula

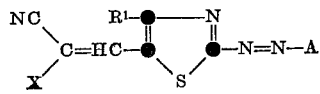

wherein

X is cyano; lower alkoxycarbonyl; lower alkoxycarbonyl substituted with hydroxy, lower alkoxy, aryl, lower dialkylamino, lower alkanoyloxy, cyano, lower alkylsulfonyl or cyclohexyl; cyclohexylcarbonyl; lower alkylcyclohexoxycarbonyl; lower alkylsulfonyl; lower alkylsulfonyl substituted with hydroxy, lower alkoxy, lower alkanoyloxy, aryl, lower dialkylamino, cyano, or cyclohexyl; cyclohexylsulfonyl; lower alkylcyclohexylsulfonyl; arylsulfonyl; carbamoyl; lower alkylcarbamoyl; di-lower alkylcarbamoyl; or 2-benzimidazolyl;

$R^1$ is hydrogen, lower alkyl, cyclohexyl, lower alkylcyclohexyl, benzyl, or aryl;

in which each aryl moiety standing alone or combined with other groups is phenyl or phenyl substituted with lower alkyl, lower alkoxy, chlorine or bromine; and wherein A has the formula

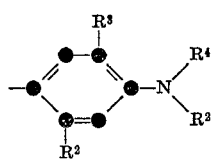

wherein $R^2$ is hydrogen, lower alkyl, lower alkoxy, halogen, or an acylamino group having the formula
—NH—Y—$R^9$
or —NHCOO—$R^{10}$ wherein
Y is —CO— or —SO$_2$—;
$R^9$ is lower alkyl; lower alkyl substituted with chlorine, bromine, aryl, cyano, lower alkoxy, lower alkylthio, lower alkylsulfonyl, hydroxy, or lower alkanoyloxy; cyclohexyl; lower alkylcyclohexyl; aryl; lower alkylamino; di-lower alkylamino; or arylamino; and
$R^{10}$ is lower alkyl, cyclohexyl, lower alkylcyclohexyl, or aryl;

R³ is hydrogen, lower alkyl, lower alkoxy, aryloxy, lower alkylthio, arylthio, chlorine or bromine;

R⁴ individually is cyclohexyl, lower alkylcyclohexyl, alkyl having 1 to 4 carbon atoms or lower alkyl substituted with hydroxy, cyano, lower alkoxy, lower cyanoalkoxy, succinimido, glutarimido, phthalimido, aryl, aryloxy, piperidino, pyrrolidinono, phthalimidino, cyclohexyl, lower alkylcyclohexyl, carbamoyl, furyl, R⁹—Y—, R¹⁰—OOC—,
R⁹—Y—NH—,
R¹⁰—OOC—NH—, R¹⁰—OOCO— or
R⁹—COO—;

R⁵ individually is hydrogen or an unsubstituted or substituted alkyl group defined in the definition of R⁴; and R⁴ and R⁵ collectively are
—CH₂CH₂—Z—CH₂CH₂—
wherein Z is —CH₂—, —O—, —S—, —SO—, or —SO₂—;

in which each aryl moiety standing alone or combined with other groups is phenyl or phenyl substituted with lower alkyl, lower alkoxy, chlorine or bromine.

2. A compound according to claim 1 having the formula

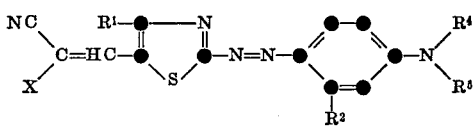

wherein

X is cyano or lower alkoxycarbonyl;
R¹ is aryl;
R² is hydrogen, methyl, lower alkanoylamino, lower alkoxycarbonylamino, benzamido, lower alkylsulfonamido, or lower alkylcarbamoyl;
R⁴ is cyclohexyl; alkyl of 1 to 4 carbon atoms; or lower alkyl substituted with cyano, chlorine, bromine, hydroxy, lower alkoxy, lower alkanoyloxy, lower alkoxycarbonyl, lower alkoxycarbonyloxy, lower alkanoylamino, carbamoyl, lower alkylcarbamoyl, di-lower alkylcarbamoyl, N-lower alkanoyl-lower alkanoylamino, N-lower alkylsulfonyl-lower alkanoylamino, benzamido, lower alkyl-sulfonamido, N-lower alkylsulfonyl-lower alkylsulfonamido, succinimido, glutarimido, phthalimido, or aryl; and
R⁵ is an unsubstituted or substituted alkyl group defined in the definition of R⁴;
in which each aryl moiety standing alone or combined with other groups is phenyl or phenyl substituted with lower alkyl, lower alkoxy, chlorine, or bromine.

3. A compound according to claim 2 wherein R¹ is phenyl; R² is lower alkanoylamino; R⁴ is benzyl, cyclohexyl, lower alkyl of 1 to 4 carbon atoms, or lower alkyl substituted with hydroxy, lower alkoxy, chlorine, bromine, cyano or lower alkanoyloxy; and R⁵ is lower alkyl or lower alkyl substituted with hydroxy, lower alkoxy, chlorine, bromine or lower alkanoyloxy.

4. A compound according to claim 1 having the formula

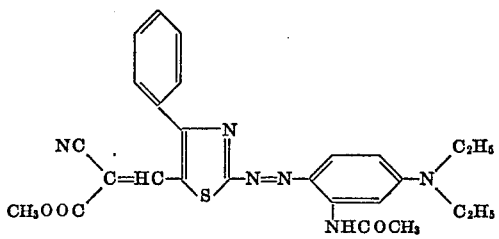

5. A compound according to claim 1 having the formula

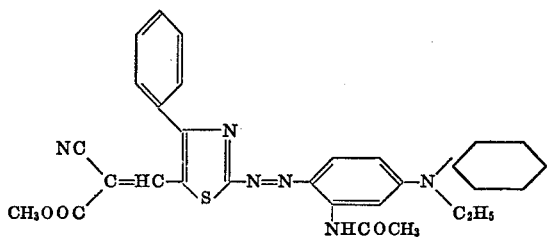

6. A compound according to claim 1 having the formula

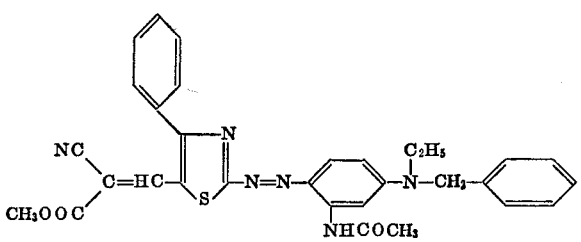

7. A compound according to claim 1 having the formula

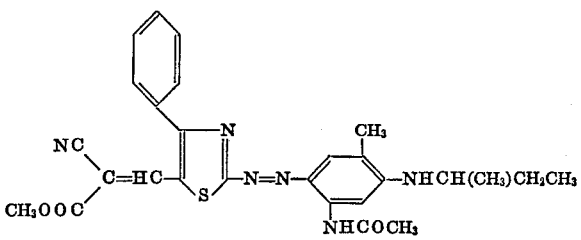

8. A compound according to claim 1 having the formula

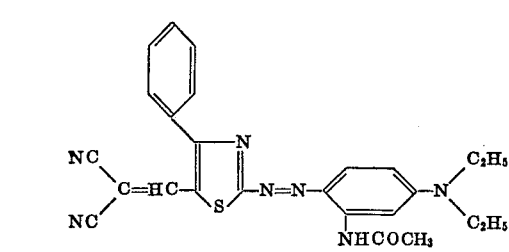

9. A compound according to claim 1 having the formula

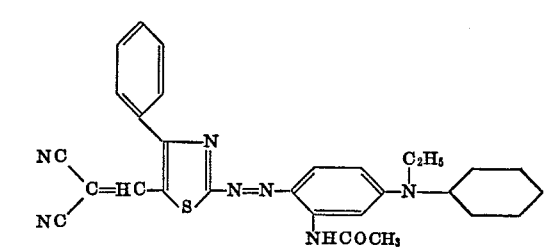

10. A compound according to claim 1 having the formula
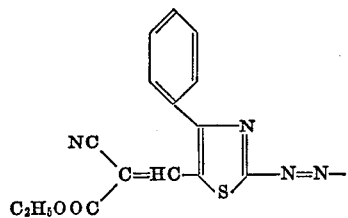
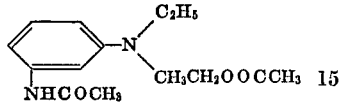
References Cited
UNITED STATES PATENTS
| 3,491,082 | 1/1970 | Weaver et al. | 260—158 |
| 3,515,714 | 6/1970 | Dale III et al. | 260—158 |
FOREIGN PATENTS
| 774,611 | 5/1957 | Great Britain | 260—158 |
| 1,390,146 | 1/1965 | France | 260—158 |
FLOYD D. HIGEL, Primary Examiner
U.S. Cl. X.R.
8—41 B, 41 C; 260—155, 306.8 R

UNITED STATES PATENT OFFICE
CERTIFICATE OF CORRECTION

Patent No. 3,829,410  Dated August 13, 1974

Inventor(s) John G. Fisher, Max A. Weaver, Clarence A. Coates, Jr.

It is certified that error appears in the above-identified patent and that said Letters Patent are hereby corrected as shown below:

Col. 20 (Claim 1), lines 55-60, delete the formula therein and insert

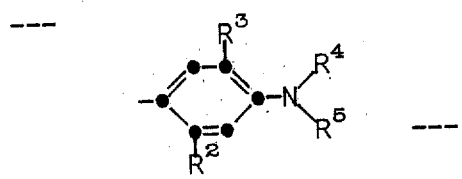

Signed and sealed this 29th day of October 1974.

(SEAL)
Attest:

McCOY M. GIBSON JR.
Attesting Officer

C. MARSHALL DANN
Commissioner of Patents